US011226492B2

(12) United States Patent
Kim et al.

(10) Patent No.: US 11,226,492 B2
(45) Date of Patent: Jan. 18, 2022

(54) THREE-DIMENSIONAL IMAGE PROJECTION

(71) Applicant: KT Corporation, Seongnam-si (KR)

(72) Inventors: Seung Cheol Kim, Seoul (KR); Jong Heum Kim, Seongnam-si (KR); Tae Gil Yang, Seoul (KR); Sang Hoon Han, Gwangmyeong-si (KR)

(73) Assignee: KT CORPORATION, Gyeonggi-Do (KR)

( * ) Notice: Subject to any disclaimer, the term of this patent is extended or adjusted under 35 U.S.C. 154(b) by 75 days.

(21) Appl. No.: 16/205,381

(22) Filed: Nov. 30, 2018

(65) Prior Publication Data

US 2020/0174268 A1    Jun. 4, 2020

(51) Int. Cl.
| | |
|---|---|
| *G02B 30/56* | (2020.01) |
| *G02B 30/52* | (2020.01) |
| *G02B 27/12* | (2006.01) |
| *G02B 27/10* | (2006.01) |
| *G03H 1/00* | (2006.01) |

(52) U.S. Cl.
CPC ......... *G02B 30/52* (2020.01); *G02B 27/1006* (2013.01); *G02B 27/126* (2013.01); *G02B 30/56* (2020.01); *G03H 1/0005* (2013.01)

(58) Field of Classification Search
CPC .. G02B 30/52; G02B 27/126; G02B 27/1006; G02B 27/2278; G02B 21/10; G02B 27/106; G02B 30/56; G02B 30/26; H04N 9/8227; G03H 1/0005
USPC .............. 359/460, 463, 629; 353/33; 349/15
See application file for complete search history.

(56) References Cited

U.S. PATENT DOCUMENTS

| | | | | |
|---|---|---|---|---|
| 5,861,993 | A * | 1/1999 | Shanks .................. | G02B 30/56 359/629 |
| 7,561,217 | B2 * | 7/2009 | Hu ......................... | G02B 7/005 349/15 |
| 7,605,981 | B2 * | 10/2009 | Adachi .................. | G02B 30/52 359/629 |
| 7,639,210 | B2 * | 12/2009 | Wynne-Powell ........................... G02B 27/0101 345/32 |
| 2002/0089744 | A1 * | 7/2002 | Myers .................. | H04N 13/305 359/465 |
| 2003/0072077 | A1 * | 4/2003 | Peterson ................ | G03B 21/10 359/460 |
| 2011/0249087 | A1 * | 10/2011 | Tsang ................... | H04N 9/8227 348/40 |

FOREIGN PATENT DOCUMENTS

| | | |
|---|---|---|
| JP | 5997606 B2 | 9/2016 |
| JP | 2016212308 A | 12/2016 |
| KR | 100816078 B1 | 3/2008 |
| KR | 101365449 B1 | 2/2014 |
| KR | 1020170039526 A | 4/2017 |

(Continued)

*Primary Examiner* — Audrey Y Chang
(74) *Attorney, Agent, or Firm* — Hamre, Schumann, Mueller & Larson, P.C.

(57) ABSTRACT

A three-dimensional image projection apparatus includes a display having a first output section that outputs a first hologram image and a second output section that outputs a second hologram image, and a prism array that is located in front of the display and refracts light rays of the first hologram image and the second hologram image, and the prism array is slanted at a first angle relative to the display.

12 Claims, 11 Drawing Sheets

(56) References Cited

FOREIGN PATENT DOCUMENTS

| KR | 1020170067097 A | 6/2017 |
|---|---|---|
| KR | 1020190019321 A | 2/2019 |

\* cited by examiner

THREE-DIMENSIONAL IMAGE PROJECTION

TECHNICAL FIELD

The present disclosure relates to a three-dimensional image projection apparatus, and methods and programs for use thereof.

BACKGROUND

Three-dimensional stereoscopic imaging refers to reconstructing a two-dimensional image by adding predetermined depth information thereto. Three-dimensional stereoscopic imaging uses binocular disparity of human eyes to provide a three-dimensional image.

Methods for separating left and right images using binocular disparity are classified into glasses-type and glasses-free-type. Examples of the glasses type method may include an anaglyph method, a polarized glasses method, and a shutter glasses method. Examples of the glasses-free type method may include a lenticular method, a parallax barrier method, and an optical plate method.

Among these conventional methods, the polarized glasses method and the shutter glasses method are the oldest three-dimensional display methods, and have been widely used in three-dimensional (3D) movies and 3D TVs. However, these methods require a viewer to wear special glasses to view stereoscopic images, and may increase eye strain for the viewer.

Among the glasses-free type methods, the lenticular method and the parallax barrier method fix a viewer's observation points to low-brightness and low-resolution images but may cause headaches or dizziness when the viewer watches the images over an extended amount of time.

Meanwhile, examples of a complete stereoscopic method include a hologram method and a volumetric 3D display method. These complete stereoscopic methods implement only static stereoscopic images through a high-priced laser and precision optical apparatus but cannot provide real-time high-quality stereoscopic images. Recently, methods for implementing low-cost real-time stereoscopic images using a half mirror, a concave mirror, a Fresnel lens, a prism array, and the like have been suggested. However, the method using a half mirror reflects an image as a virtual image and requires a large system, and the methods using a concave mirror and a Fresnel lens incur high manufacturing costs and provide a narrow viewing angle.

To solve this problem, a method of forming a virtual stereoscopic image in space using a prism array has been recently suggested. In this method, a prism array is provided on a front top end of a display panel, and a stereoscopic image is projected behind the prism array. Meanwhile, a method of projecting a 3D image having multiple layers in space has been recently suggested to improve a hologram effect in a prism array-based hologram apparatus.

Figure 1:
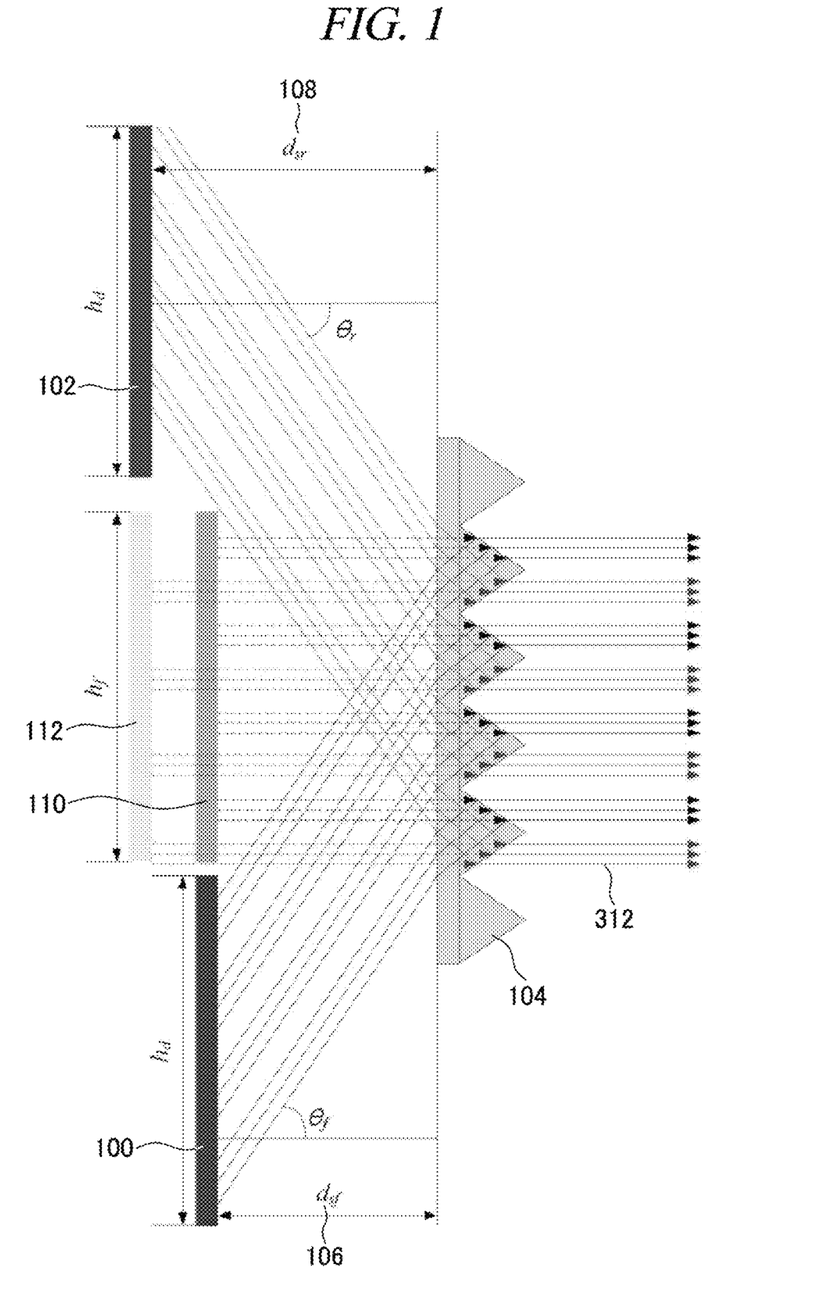
FIG. 1 is a diagram illustrating a conventional 3D image projection apparatus using a dual display.

FIG. 1 shows a conventional three-dimensional image projection apparatus using a dual display that includes a first display 100 that outputs a first hologram image, a second display 102 that outputs a second hologram image, and a prism array 104. The first display 100 is located behind and under the prism array 104 at a first distance 106 from the prism array 104. The second display 102 is located behind and above the prism array 104 at a second distance 108 from the prism array 104. The conventional 3D image projection apparatus using a dual display can project a 3D image 110 corresponding to the first hologram image and a 3D image 112 corresponding to the second hologram image with different depths in space due to a difference in distance between the first display 100 and the second display 102, respectively, from the prism array 104.

According to the method of projecting a three-dimensional image having two layers in the conventional three-dimensional image projection apparatus using a dual display, two displays need to be located at different depths, respectively, and the bezel thickness of the displays needs to be considered, leading to an increase in size of the entire system. To solve this problem, a method of projecting a three-dimensional image having two layers with a single display has been suggested.

Figure 2:
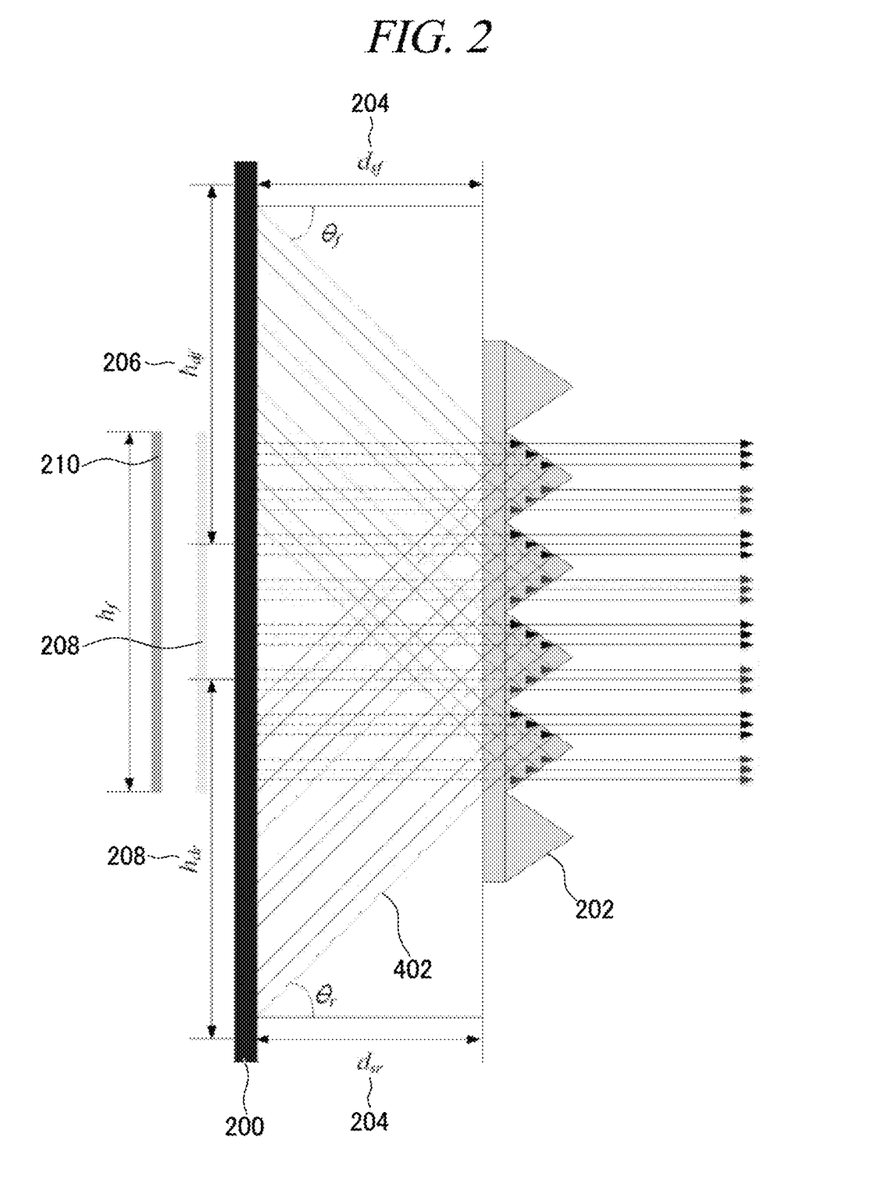
FIG. 2 is a diagram illustrating a conventional 3D image projection apparatus using a single display.

FIG. 2 shows a conventional three-dimensional image projection apparatus using a single display that includes a display 200 and a prism array 202. The display 200 is located behind the prism array 202 at a predetermined distance 204 from the prism array 202 and is horizontal relative to the prism array 202. The display 200 may be divided into same-size sections: a first section 206 that outputs a first hologram image; and a second section 208 that outputs a second hologram image to output different hologram images, respectively. In the conventional 3D image projection apparatus using a single display, the display 20 is located horizontally relative to the prism array 202, and, thus, when a viewer looks at the three-dimensional image projection apparatus from the front, a first 3D image 208 corresponding to the first hologram image and a second 3D image 210 corresponding to the second hologram image are located at the same depth. Accordingly, there is no sense of depth between the first 3D image 208 and the second 3D image 210. There is a sense of depth only when the viewer looks down from above or looks up from below. Further, if the viewer moves while looking at the first 3D image 208 and the second 3D image 210, the depths of the respective images are changed and then reversed when exceeding a certain critical point.

Further, since the conventional 3D image projection apparatus using a single display uses a display divided into the two same-size sections, the size of 3D images projected in space is reduced, and an unnecessary image out of a predetermined field of view is seen. Therefore, the field of view of the entire system is limited. Furthermore, the depth of the system needs to be increased by the height of 3D images projected in space, which leads to an increase in size of the entire system.

To solve this problem, a method using an asymmetrical prism array has been suggested. However, according to this method, a 3D image may be slantingly seen depending on the position of the field of view. Even in the 3D image projection apparatus using an asymmetrical prism array, a display is divided into two sections, and, thus, the size of 3D images projected in space is reduced. Further, the prism array is placed horizontally, and a distance between the display and the prism array is increased; thus, when the viewer looks at the system from left and from right, smile distortion that refers to floating or sinking of 3D images may occur. Therefore, the effective field of view on the left and right sides may be limited.

SUMMARY

At least some of the embodiments described herein facilitate a dual-layer 3D image using a single display provided at a predetermined angle from a prism array. Further, the at least some of the embodiments described herein include manufacturing a section of the single display that outputs a first hologram image to be larger than another section that outputs a second hologram image. Furthermore, the at least some of the embodiments described herein block a light ray that interferes with a predetermined field of view among light rays of the first hologram image by placing a field of view control filter on the front of the section of the single display that outputs the first hologram image. However, problems to be solved by the embodiments described herein are not limited to the above-described problems.

At least some of the embodiments described herein pertain to a 3D image projection apparatus that includes: a display having a first output section that outputs a first hologram image and a second output section that outputs a second hologram image; and a prism array that is located in front of the display and refracts light rays of the first hologram image and the second hologram image, and the prism array is slanted at a first angle from the display.

In at least one embodiment, the 3D image projection apparatus further includes a field of view control filter that is located on the front of the first output section and blocks a light ray incident at a second angle among the light rays of the first hologram image. The field of view control filter may include multiple barriers extended in a transverse direction between an upper surface and a lower surface. The multiple barriers may be protruded vertically from the lower surface toward the upper surface, with a gap along a longitudinal direction. The field of view control filter may be configured to control the second angle by changing at least one of the height and the arrangement gap of the multiple barriers.

In at least one embodiment, the first hologram image may be an object image and the second hologram image may be a background image.

In at least one embodiment, the first output section may be larger than the second output section. The first output section may be an upper section of the display and the second output section may be a lower section of the display.

In at least one embodiment, a 3D image corresponding to the first hologram image may be slanted at a third angle from the display.

In at least one embodiment, a light ray refracted by a first facet of the prism array among the light rays output from the first hologram image may proceed toward a viewer, and a light ray refracted by a second facet of the prism array among the light rays output from the second hologram image may proceed toward the viewer.

At least one of the embodiments described herein pertains to a 3D image projection apparatus that includes: a first display that outputs a first hologram image and a second display that is adjacent to the first display and outputs a second hologram image; and a prism array that is located in front of the first display and second display and refracts light rays of the first hologram image and the second hologram image, and the prism array is slanted at a first angle from the first display and second display.

In at least one embodiment, the 3D image projection apparatus may further include a field of view control filter that is located on the front of any one of the first display and the second display and blocks a light ray incident at a second angle among the light rays of the first hologram image.

In at least one embodiment, the first hologram image may be an object image and the second hologram image may be a background image.

In at least one embodiment, the first display may be formed to have a greater height than the second display.

In at least one embodiment, a 3D image corresponding to the first hologram image may be slanted at a third angle from the first display and second display.

In at least one embodiment, a light ray refracted by a first facet of the prism array among the light rays' output from the first hologram image may proceed toward a viewer, and a light ray refracted by a second facet of the prism array among the light rays' output from the second hologram image may proceed toward the viewer.

The embodiments referenced above and described hereafter are provided by way of illustration only and should not be construed as liming the present disclosure. Besides the above-described embodiments, there may be additional embodiments described in the accompanying drawings and the detailed description.

According to any one of the above-described embodiments of the present disclosure, it is possible to provide a dual-layer 3D image using a single display provided at a predetermined angle from a prism array. Accordingly, the size of the system may be reduced. Further, since a section of the single display that outputs a first hologram image is formed larger than another section that outputs a second hologram image, a larger 3D image (corresponding to the first hologram image) can be projected in space. Further still, since a field of view control filter is placed on the front of the section of the single display that outputs the first hologram image, it is possible to block a light ray that interferes with a predetermined field of view among light rays of the first hologram image. Accordingly, it is possible to increase the overall field of view of the system and avoid overlapping of 3D images formed by refracting light rays of the respective hologram images. It is also possible to provide a larger 3D image in a wider vertical field of view.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Hereafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" includes a unit implemented by hardware, a unit implemented by software, and a unit implemented by both of them. One unit may be implemented by two or more pieces of hardware, and two or more units may be implemented by one piece of hardware.

Hereinafter, the present disclosure will be explained in detail with reference to the accompanying configuration views or process flowcharts.

Figure 3:
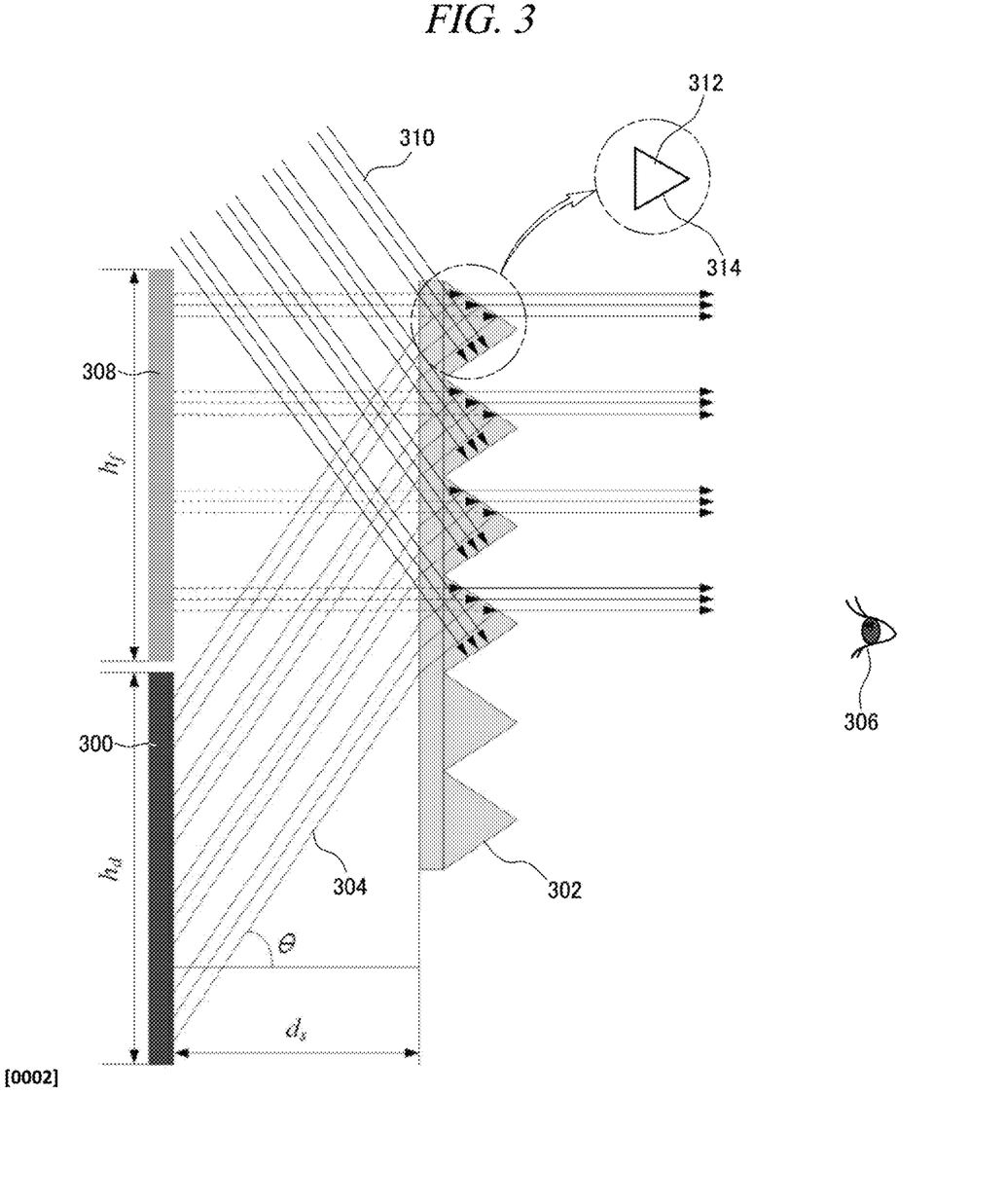
FIG. 3 is a diagram provided to explain the principle of projecting a 3D image by a prism array.

FIG. 3 is a diagram provided to explain the principle of projecting a 3D image by a prism array.

Referring to FIG. 3, a first light ray 304 incident into a prism array 302 in a first direction among light rays of a hologram image output from a display 300 is refracted by the prism array 302. Herein, a viewer 306 can observe a stereoscopic image projected as a virtual image behind the prism array 302. Meanwhile, a light ray 310 of a background image incident into the prism array 302 in a second direction from a real space is refracted by the prism array 302, and then proceeds toward the viewer 306. In other words, the first light ray 304 output from the display 300 is refracted passing through a first facet 312 of the prism, and the background light ray 310 is refracted passing through a second facet 314 of the prism. Thus, a stereoscopic image 308 and a real background image are projected together.

Figure 4:
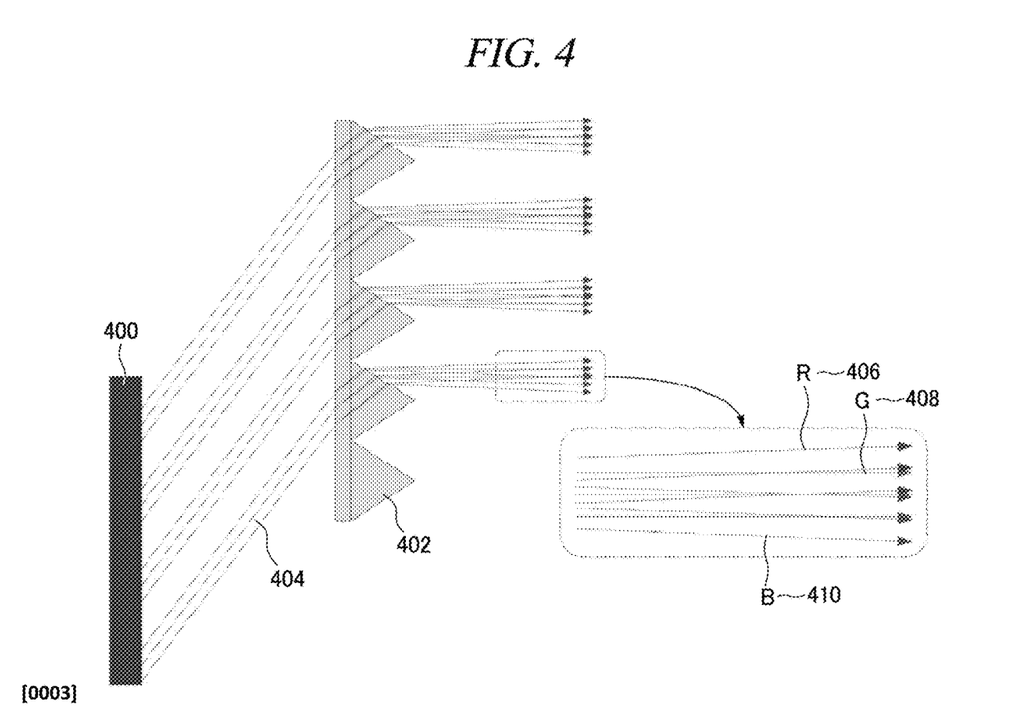
FIG. 4 is a diagram provided to explain chromatic aberration occurring in a floating hologram system.

FIG. 4 is a diagram provided to explain chromatic aberration occurring in a floating hologram system. Referring to FIG. 4, when a first light ray 404 output from a display 400 passes through a prism array 402, a light ray 406 of a red wavelength, a light ray 408 of a green wavelength, and a light ray 410 of a blue wavelength are dispersed to different positions due to a difference in refractive index among the wavelengths. Therefore, chromatic aberration of a floating hologram occurs.

Figure 5:
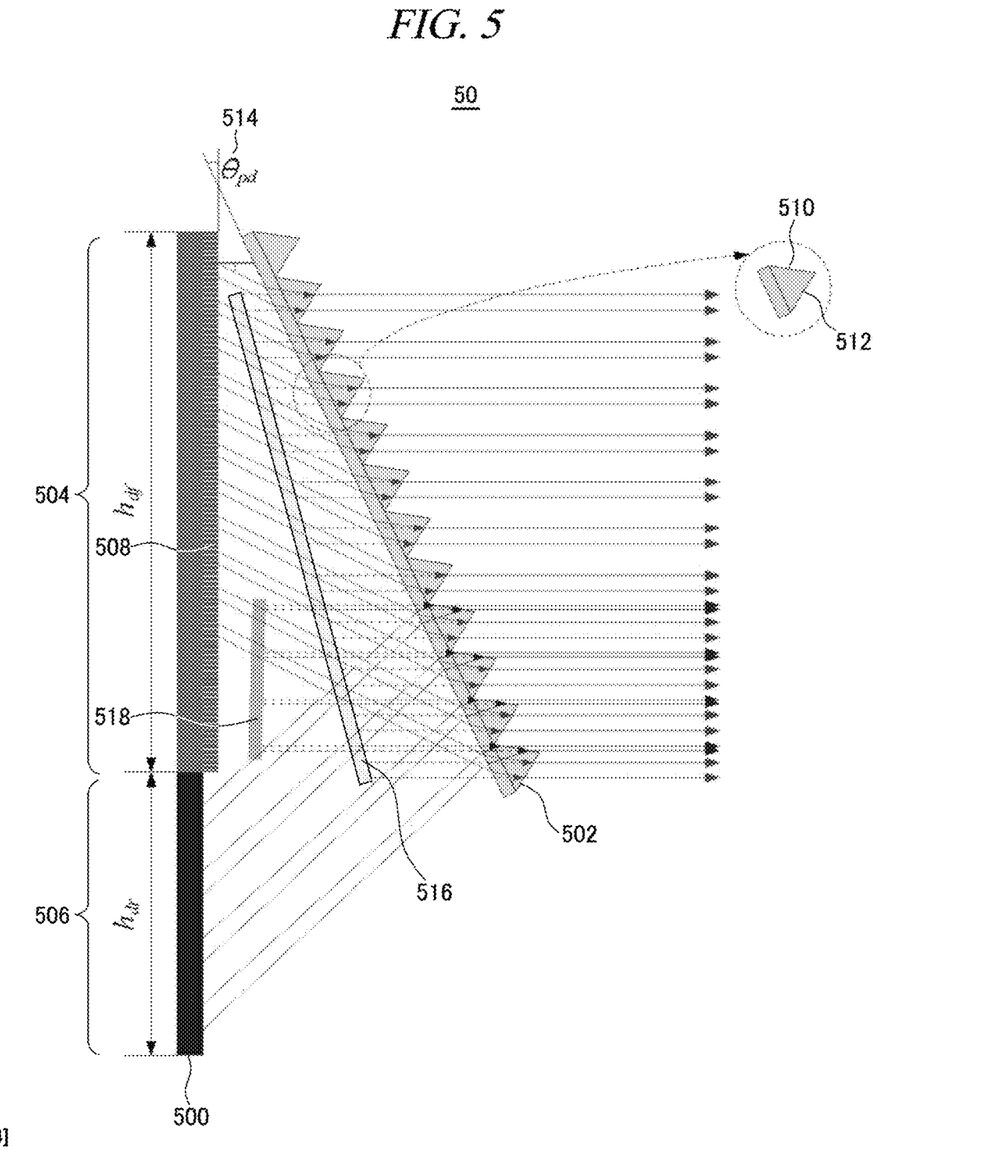
FIG. 5 is a diagram provided to explain a 3D image projection apparatus in accordance with various embodiments described herein.

FIG. 5 is a diagram provided to explain a 3D image projection apparatus 50 in accordance with an embodiment of the present disclosure.

FIG. 5 shows 3D image projection apparatus 50, in accordance with various embodiments described herein, which may include a display 500 and a prism array 502. The 3D image projection apparatus 50 illustrated in FIG. 5 is just an embodiment of the present disclosure and should not be construed as liming the present disclosure. Apparatus 50 may be configured differently according to various embodiments of the present disclosure.

The display 500 may output multiple hologram images to the front of the 3D image projection apparatus 50. That is, the display 500 may include a first output section 504 that outputs a first hologram image and a second output section 506 that outputs a second hologram image. Herein, the first output section 504 of the display 500 may be set as an upper section of the display 500, and the second output section 506 of the display 500 may be set as a lower section of the display 500. For example, the first output section 504 may be formed to have a greater height than the second output section 506, thus, a larger 3D image corresponding to the first hologram image can be projected in space.

The display 500 can adjust the height of the first output section 504 and the height of the second output section 506 in various ways depending on a 3D image to be projected in a specific size.

The display 500 may output an object image as the first hologram image through the first output section 504 and a background image as the second hologram image through the second output section 506.

The display 500 may include one of a liquid crystal display (LCD), an organic light emitting diode (OLED) display, and a quantum dot display that can output a two-dimensional image. In accordance with at least one embodiment, the display 500 may include one of 3D displays including a parallax barrier, a lenticular lens, and a prism array that can output a 3D image. In another embodiment, the display 500 may include an integral imaging display, a hologram display, a rotating-screen volumetric display, a multilayer volumetric display, and the like that can output a 3D volumetric image.

The display 500 may include a field of view control filter 508 configured to control the field of view on the front of the first output section 504 of the display 500. The field of view control filter 508 may include a field of view filter using a parallax barrier, a diffractive optical element (DOE), or a hologram optical (HOE). Further, the display 500 may further include a field of view control optical system on the rear of the display 500 to control the field of view of the display 500.

The field of view control filter 508 may suppress wide dispersion of light rays by blocking a light ray incident in a predetermined range of angle (e.g., a second angle) among light rays of the first hologram image output from the first output section 504 of the display 500.

For example, first light rays (light rays incident at any angle other than the second angle) of the first hologram image output from the first output section 504 of the display 500 pass through the field of view control filter 508 and are refracted by a second facet 512 of the prism array 502 and form a 3D image, whereas a second light (light ray incident at the second angle) output in a different direction from the first light rays is blocked by the field of view control filter 508.

The field of view control filter 508 will be described briefly with reference to FIG. 6A to FIG. 6C.

Figure 6A:
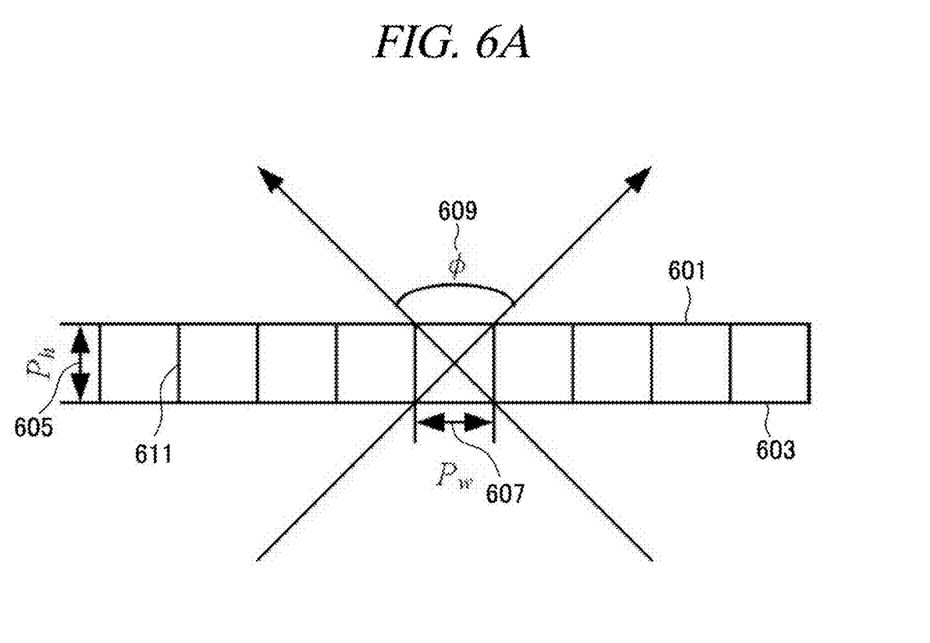
FIG. 6A to FIG. 6C are diagrams provided to explain multiple barriers used in a field of view control filter in accordance with various embodiments described herein.

FIG. 6A shows the field of view control filter 508 that includes an upper surface 601, a lower surface 603, and multiple barriers 611 extended in a transverse direction between the upper surface 601 and the lower surface 603.

The multiple barriers 611 may protrude in a vertical direction from the lower surface 603 toward the upper surface 601 and have a gap along a longitudinal direction when a viewer looks at the 3D image projection apparatus 50.

If a height 605 of the multiple barriers 611 is $P_h$ and an arrangement gap 607 between the multiple barriers 611 is $P_w$, a pass angle 609 of light rays of a hologram image which can pass through the field of view control filter 508 may be represented by Equation 1.

$$\phi = 2\tan^{-1}\frac{P_w}{P_h} \qquad \text{[Equation 1]}$$

Figure 6B:
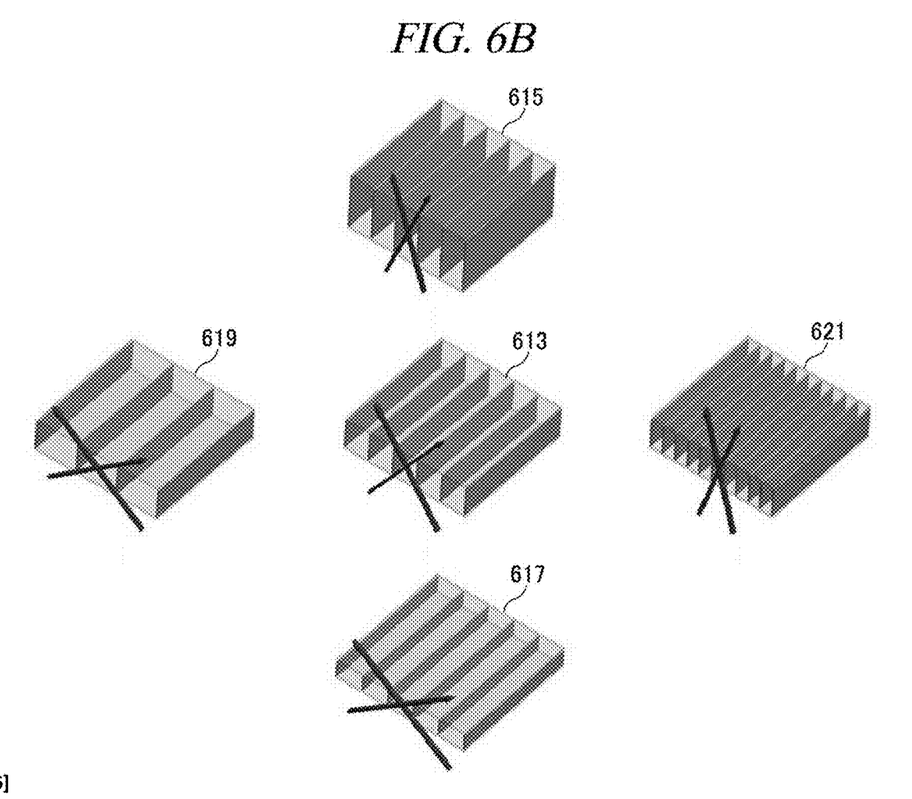

FIG. 6B shows the field of view control filter 508 controlling the second angle for blocking a light ray by changing at least one of the height and the arrangement gap 607 of the multiple barriers 611. For example, reference numeral 613 denotes a first layout of the multiple barriers 611 that allows only light rays within a specific range of angle to pass through, thus a stereoscopic image can be seen only from a specific direction.

Reference numeral 615 denotes a second layout of the multiple barriers 611 in which the barriers 611 are set to have a relatively great height, and thus can narrow a pass angle of light rays.

Reference numeral 617 denotes a third layout of the multiple barriers 611 in which the barriers 611 are set to have a small height, and thus can widen a pass angle of light rays. Moreover, as indicated by reference numerals 619 and 621, the multiple layers 611 may be set to be placed with a wide or narrow arrangement gap and thus can widen or narrow a pass angle of light rays.

Figure 6C:
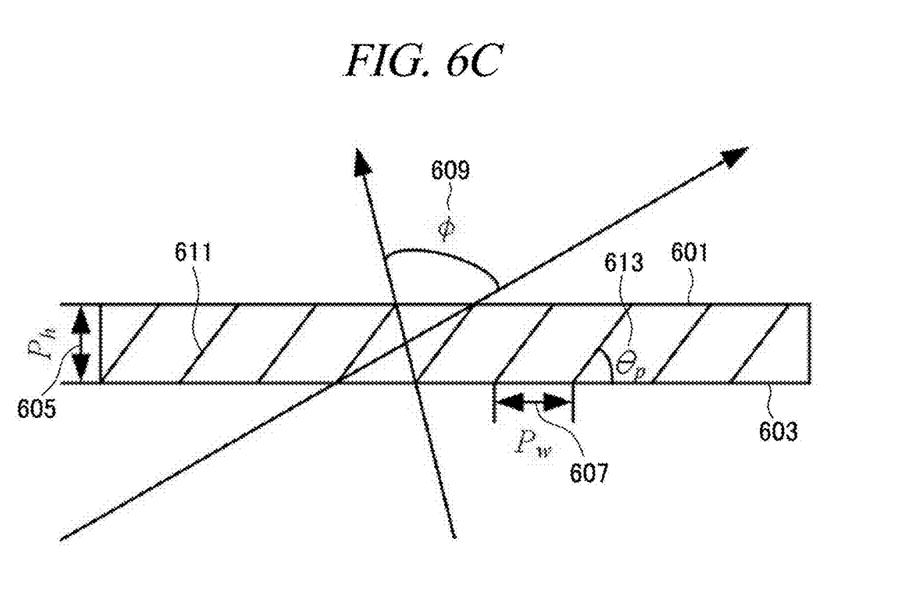

FIG. 6C shows left and right viewing angles may change depending on an angle between the display 500 and the prism array 502, a prism vertical angle of the prism array 502, and the like. To solve this problem, the field of view control filter 508 in which the multiple barriers 611 are slanted at a predetermined angle $\theta_p$.

The multiple barriers 611 protrude and are slanted at the predetermined angle $\theta_p$, and may be placed with a gap along a longitudinal direction when the viewer looks at the 3D image projection apparatus 50.

Since the multiple barriers 611 are slanted, only light rays approximately parallel to the respective barriers 611 can pass through the field of view control filter 508.

If the arrangement gap 607 of the multiple barriers 611 $P_w$, the height 605 thereof is $P_h$, and a slant angle of each barrier 611 is $\theta_p$, the pass angle 609 of light rays passing through the field of view control filter 508 can be represented by Equation 2.

$$\phi = 180 - \tan^{-1}\frac{P_h}{P_w + (p_h/\tan\theta_p)} + \tan^{-1}\frac{P_h}{P_w - (p_h/\tan\theta_p)} \qquad \text{[Equation 2]}$$

Therefore, the field of view control filter 508 controls an output direction and a pass angle of light rays by adjusting the height 605, the arrangement gap 607, and the angle (degree of slant $\theta_p$) of the multiple barriers 611.

Referring to FIG. 5 again, the prism array 502 may be located in front of the display 500, and is configured to refract light rays of the first hologram image output from the first output section 504 of the display 500 and light rays of the second hologram image output from the second output section 506 of the display 500.

A light ray incident into the prism array 502 in a first direction among the light rays of the first hologram image output from the first output section 504 is refracted by the second facet 512 of the prism array 502 and then proceeds toward a viewing direction of the viewer. Meanwhile, a light ray incident into the prism array 502 in any direction other than the first direction among the light rays of the first hologram image may be totally reflected or refracted within the prism array 502, and then may proceed in other directions other than the viewing direction of the viewer.

The field of view control filter 508 is not provided in the second output section 506 of the display 500, thus, the light rays of the second hologram image output from the second output section 506 are dispersed widely. In this case, only a light ray refracted by a first facet 510 of the prism array 502 among the light rays of the second hologram image proceeds toward the viewing direction of the viewer.

The prism array 502 may be slanted at a first angle 514 relative to the display 500.

A light ray of the first hologram image output from a lower part of the first output section 504 among light rays of the first hologram image output from the first output section 504 and incident into the prism array 502 has a greater incident distance and a 3D image 516 corresponding to the first hologram image is slanted at a third angle relative to the apparatus 500.

For example, the first angle 514 between the display 500 and the prism array 502 may be about 20 degrees, and the third angle may be about 10 degrees.

Meanwhile, light rays of the second hologram image output from the second output section 506 of the display 500 have a greater distance to the prism array 502, thus, a 3D image 518 corresponding to the second hologram image is projected as a virtual image behind the 3D image 516 corresponding to the first hologram image and distant from the prism array 502.

A difference in incident path between light rays of the first hologram image and light rays of the second hologram image causes a difference in depth between 3D images projected in space. The difference in depth enables the viewer to have a sense the difference in dimensionality.

A projection distance of the 3D image 516 corresponding to the first hologram image from the prism array 502 can be derived from Equation 3, and a projection distance of the 3D image 518 corresponding to the second hologram image from the prism array 502 can be derived from Equation 4.

$$D_f = \frac{d_s}{\cos\theta_f} \qquad \text{[Equation 3]}$$

$D_f$ represents a projection distance of the 3D image 516 corresponding to the first hologram image, $d_s$ represents a distance between the prism array 502 and the display 500, and $\theta_r$ represents an angle of a light ray incident into the prism array 502 from the first output section 504 of the display 500.

$$D_r = \frac{d_s}{\cos\theta_r} \qquad \text{[Equation 4]}$$

$D_r$ represents a projection distance of the 3D image 518 corresponding to the second hologram image, $d_s$ represents a distance between the prism array 502 and the display 500, and $\theta_f$ represents an angle of a light ray incident into the prism array 502 from the second output section 506 of the display 500.

Meanwhile, when light moves in two materials having different refractive indexes, the transmission coefficients and reflection coefficients of the light having a polarity orthogonal to an incident surface can be defined as Equation 5 to Equation 8, by Fresnel equation.

$$R_s = \frac{n_1\cos\theta_i - n_2\cos\theta_t}{n_1\cos\theta_i + n_2\cos\theta_t} = T_s - 1 \qquad \text{[Equation 5]}$$

$$R_p = \frac{n_2\cos\theta_i - n_1\cos\theta_t}{n_1\cos\theta_t + n_2\cos\theta_i} \qquad \text{[Equation 6]}$$

$$T_s = \frac{2n_1\cos\theta_i}{n_1\cos\theta_i + n_2\cos\theta_t} = R_s + 1 \qquad \text{[Equation 7]}$$

$$T_p = \frac{2n_1\cos\theta_i}{n_1\cos\theta_t + n_2\cos\theta_i} \qquad \text{[Equation 8]}$$

When the light passes through the prism array 502 to the air, if an incident medium has a higher refractive index than a transmission medium, internal reflection occurs.

The internal reflection satisfies $\Theta_i < \Theta_t$ according to Snell's law, and according to this relationship, a reflection coefficient $R_s$ of a S wave is a positive value and becomes 1 at a critical angle $\Theta_c$. That is, since the relationship $\Theta_j < \Theta_t$ is satisfied, a transmission light ray gets closer to a border as $\Theta_i$ increases, thus, more energy is reflected accordingly. Accordingly, an incident angle at $\theta_t = 90$ becomes a critical angle. That is, if an incident angle is equal to or greater than the critical angle, all incident lights undergo total internal reflection and then return to the incident medium, i.e., the prism array. A critical angle in internal reflection can be calculated by Equation 9.

$$\theta_c = \sin^{-1}\left(\frac{n_t}{n_i}\right) \qquad \text{[Equation 9]}$$

If the transmission coefficient and the reflection coefficient are calculated while increasing the incident angle, a specific angle at which the reflection coefficient of a P wave is 0 can be obtained in the same manner as the critical angle is obtained. The specific angle is called Brewster's angle at which a P wave is allowed to pass through without reflection. The Brewster's angle in internal reflection can be calculated by Equation 10.

$$\theta_c = \tan^{-1}\left(\frac{n_t}{n_i}\right) \qquad \text{[Equation 10]}$$

Therefore, a proceeding path of a light ray may vary depending on an incident angle to the prism array 502. That is, light rays output from the display 500 include light rays moving along a predetermined path toward the viewing direction of the viewer, and light rays moving along other paths which is different from the predetermined path because of total reflection within the prism array 502.

Some of the light rays may be reflected again from the rear of the prism array 502, and then may proceed toward the viewing direction of the viewer through the prism array 502. A light ray incident at an angle with high reflection coefficient and reflectivity may cause noise in a 3D image due to internal reflection by the prism array 502.

To remove the noise image caused by internal reflection noise, a polarizing filter may be attached to the first facet 510 or the second facet 512 of the prism array 502.

Most components of the light rays output toward the viewing direction of the viewer are components of S waves in terms of reflection coefficients. Therefore, it is possible to remove the noise image caused by internal reflection by filtering the components of S waves.

Figure 7:
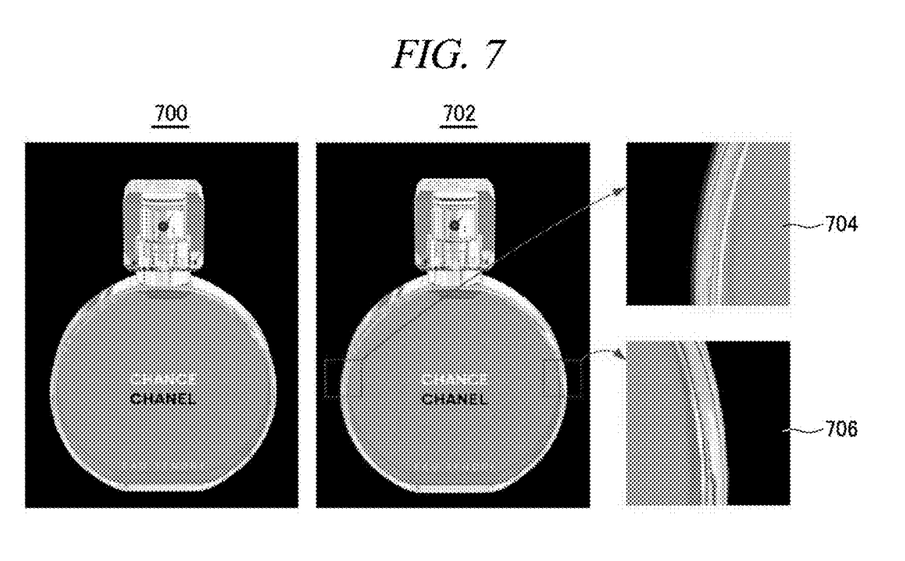
FIG. 7 is a diagram provided to explain a method of correcting chromatic aberration in accordance with various embodiments described herein.

FIG. 7 is a diagram provided to explain a method of correcting chromatic aberration in accordance with an embodiment of the present disclosure.

Referring to FIG. 7, reference numeral 700 denotes a 3D image whose chromatic aberration is not corrected, and reference numeral 702 denotes a 3D image whose chromatic aberration is corrected. By comparing these two images, it can be seen that some pixels for each of RGB colors move.

For example, if the display 300 is placed in parallel to the prism array 302 as shown in FIG. 3, there is a uniform gap between the display 300 and the prism array 302. In this case, the amount of color dispersion for the entire section is uniform. Therefore, a predetermined number of pixels for the entire image is moved to give inverse distortion and thus correct chromatic aberration.

However, if the display 500 is slanted at the first angle 514 relative to the prism array 502 as shown in FIG. 5, there is a difference in distance between the display 500 and the prism array 502 depending on internal locations thereof. Thus, there is a difference in an amount of pixel movement for correcting chromatic aberration.

In this case, a distance between each section of the display 500 and the prism array 502 is changed linearly depending on a location of the display 500. Therefore, a pixel movement amount for each portion of the image can be obtained by selecting a portion with the greatest distance and a portion with the shortest distance, calculating a pixel movement amount for each location, and linearly applying the calculated amount to a location of the display 500. Pixels move by as much as the calculated pixel movement amount to give inverse distortion and thus correct chromatic aberration.

It can be seen from an enlarged image 704 of a left portion of the 3D image 702 that many pixels move, and it can be seen from an enlarged image 706 of a right portion of the 3D image 702 that few pixels move due to a short distance from the display 500.

Figure 8A:
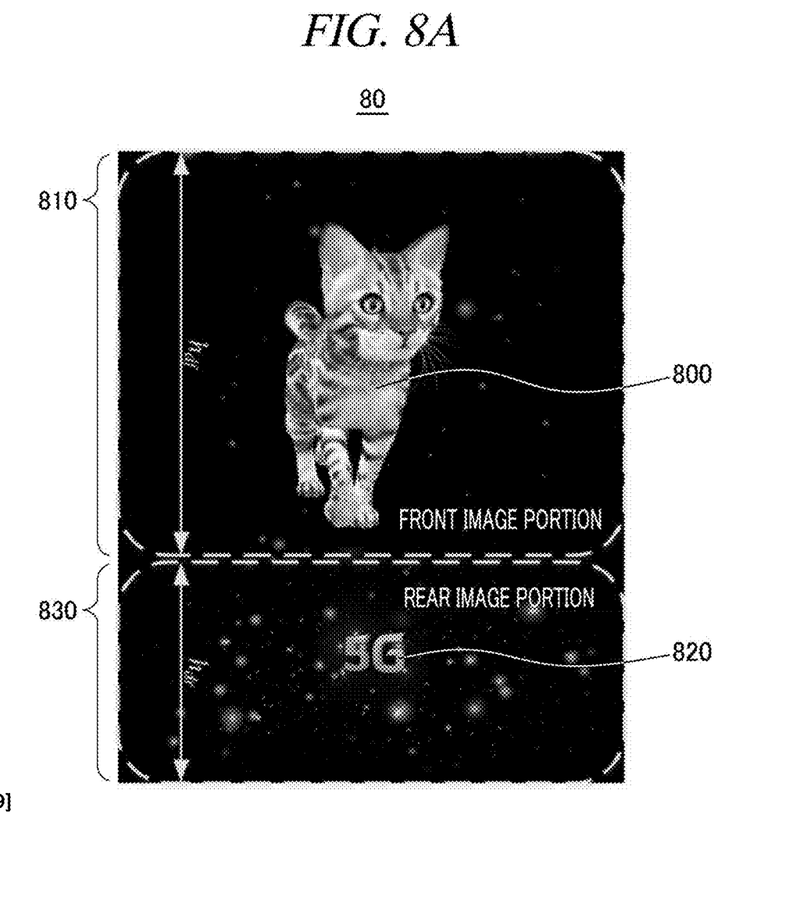
FIG. 8A and FIG. 8B are diagrams provided to explain a 3D image projected by a 3D image projection apparatus in accordance with various embodiments described herein.
Figure 8B:
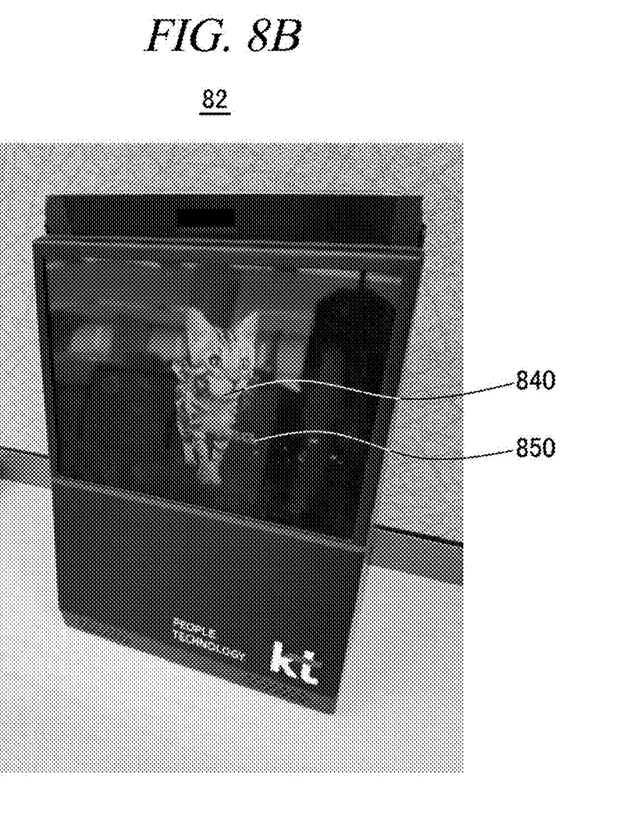

FIG. 8A and FIG. 8B are diagrams provided to explain a 3D image projected by the 3D image projection apparatus 50 in accordance with an embodiment of the present disclosure.

Referring to FIG. 8A, reference numeral 80 shows an input image for the 3D image projection apparatus 50. A first hologram image (e.g., object image) 800 may be output through the first output section 810 and a second hologram image (e.g., background image) 820 may be output through the second output section 820. Herein, the respective heights of the first output section 810 and the second output section 830 can be adjusted depending on the properties of the system.

Referring to FIG. 8B, reference numeral 82 shows that the input image denoted by reference numeral 80 is displayed through the 3D image projection apparatus 50. It can be seen that a first 3D image 840 corresponding to a first hologram image 800 is formed in front, and a second 3D image 850 corresponding to a second hologram image 850 is formed behind the first 3D image 840.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A three-dimensional image projection apparatus, comprising:
   a display having a first output section that outputs a first hologram image that is an object image and a second output section that outputs a second hologram image that is a background image;
   a prism array, located in front of the display and slanted at a first angle with respect to the display, to refract light rays of the first hologram image and the second hologram image; and
   a field of view control filter, located in front of only the first output section, to block light rays incident at a second angle among the light rays of the first hologram image and to pass light rays incident at a part of angles other than the second angle, and
   wherein the second output section is located further away from the prism array than the first output section to make the first hologram image appear to be in front of the second hologram image.

2. The three-dimensional image projection apparatus of claim 1, wherein the field of view control filter includes multiple barriers extended in a transverse direction between an upper surface and a lower surface.

3. The three-dimensional image projection apparatus of claim 2, wherein the multiple barriers protrude in a vertical direction from the lower surface toward the upper surface and have a gap therebetween along a longitudinal direction.

4. The three-dimensional image projection apparatus of claim 1, wherein the field of view control filter is to control the second angle by changing at least one of a height and an arrangement gap of the multiple barriers.

5. The three-dimensional image projection apparatus of claim 1, wherein the first output section is larger than the second output section.

6. The three-dimensional image projection apparatus of claim 1, wherein the first output section is an upper section of the display, and the second output section is a lower section of the display.

7. The three-dimensional image projection apparatus of claim 1, wherein a three-dimensional image corresponding to the first hologram image is slanted at a third angle relative to the display.

8. The three-dimensional image projection apparatus of claim 1, wherein a light ray refracted by a first facet of the prism array among the light rays output from the first hologram image proceeds toward a viewer, and a light ray refracted by a second facet of the prism array among the light rays output from the second hologram image proceeds toward the viewer.

9. A three-dimensional image projection apparatus, comprising:
   a first display to output a first hologram image that is an object image; and
   a second display that is adjacent to the first display and outputs a second hologram image that is a background image;
   a prism array, located in front of the first display and second display, to refract light rays of the first hologram image and the second hologram image; and
   a field of view control filter, located in front of only the first display, to block light rays incident at a second angle among the light rays of the first hologram image and to pass light rays incident at a part of angles other than the second angle,
   wherein the prism array is slanted at a first angle from the first display and second display, and
   wherein the second output section is located further away from the prism array than the first output section to make the first hologram image appear to be in front of the second hologram image.

10. The three-dimensional image projection apparatus of claim 9, wherein the first display has a greater height than the second display.

11. The three-dimensional image projection apparatus of claim 9, wherein a three-dimensional image corresponding to the first hologram image is slanted at a third angle relative to the first display and second display.

12. The three-dimensional image projection apparatus of claim 9, wherein a light ray refracted by a first facet of the prism array among the light rays output from the first hologram image proceeds toward a viewer and a light ray refracted by a second facet of the prism array among the light rays output from the second hologram image proceeds toward the viewer.

* * * * *